G. E. ESCHER.
SOFFIT CLIP.
APPLICATION FILED NOV. 17, 1910.

1,028,559.

Patented June 4, 1912.

BEST AVAILABLE COPY

Witnesses:
M. M. Riemann
A. C. Carhew

Inventor
Gustav Edward Escher,
By his Attorney
Herbert G. Ogden

COLUMBIA PLANOGRAPH CO., WASHINGTON, D. C.

UNITED STATES PATENT OFFICE.

GUSTAV EDWARD ESCHER, OF SOUTH ORANGE, NEW JERSEY.

SOFFIT-CLIP.

1,028,559.  Specification of Letters Patent.  Patented June 4, 1912.

Application filed November 17, 1910. Serial No. 592,913.

*To all whom it may concern:*

Be it known that I, GUSTAV EDWARD ESCHER, a citizen of the United States, and a resident of South Orange, New Jersey, have invented certain new and useful Improvements in Soffit-Clips, of which the following is a specification accompanied by drawings.

This invention relates to improvements in concrete floor construction, but more particularly to the clips or reinforcements for holding the soffit or under horizontal portion of the cementitious material surrounding the beam up against the lower portion of the beam.

The weak points in the soffit, or under horizontal portion of the cementitious material have been found to be at each side of the lower portion of the beam, and after the centering or mold boards have been removed, the soffit is apt to crack and fall away from the beam. This is particularly apt to happen in those cases in which the free flow of material has been obstructed, as for instance, by reason of using reinforcing clips of faulty mechanical construction or which present comparatively broad surfaces to the direction of flow, so that great difficulty is experienced in tamping the material, permitting voids to form underneath the beam, which appear when the mold boards are removed, thus weakening the soffit and presenting a poor and unsightly construction.

The objects of this invention are primarily to afford means for efficiently reinforcing the soffit without obstructing the free flow of material in tamping, thus preventing the formation of voids and securing a perfect bond without care or trouble thereafter. To these ends the reinforcing clips are formed out of comparatively narrow pieces of metal of suitable cross-section and each clip is preferably constructed in a single piece bent to the required form. All parts of the clip preferably lie in the same plane, so that there is no tendency whatever to obstruct the flow of material, and the material has no difficulty in entirely incasing the clips, thus forming a perfect bond, and accomplishing the utmost for which the clips are installed.

Further objects of the invention are to simplify and cheapen the cost of the clips, produce clips which may be easily and quickly applied to a beam and spaced at will along the beam, and wholly embedded in the cementitious material surrounding the beam.

To all of these ends the invention consists of a floor construction embodying reinforcing clips shown in their preferred forms in the accompanying drawings, in which—

Figure 1:
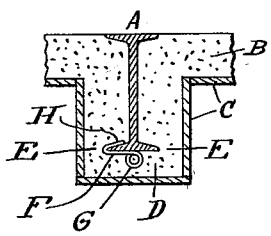
Figure 19:
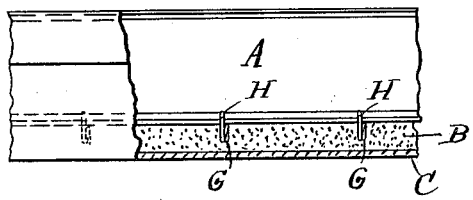
Figure 14:
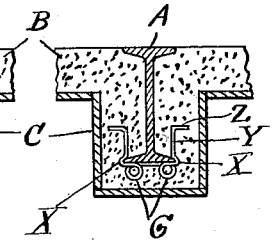
Figure 15:
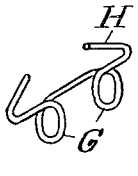
Figure 16:
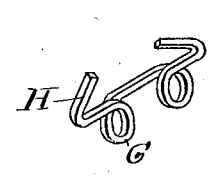
Figure 17:
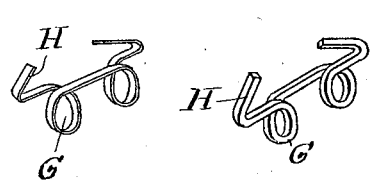
Figure 18:
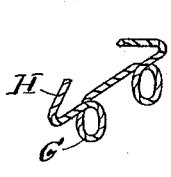

Figure 1 is an end elevation partly in section showing the invention applied to a steel beam embedded in cementitious material; Figs. 2 to 14 are similar views of modifications of the invention; Fig. 15 is a perspective view of a soffit clip constructed from round material; Fig. 16 is a perspective view of a soffit clip constructed of flat or band material; Fig. 17 is a perspective view of a soffit clip constructed of square material; Fig. 18 is a perspective view of a soffit clip constructed of square twisted material; and Fig. 19 is a side elevation of the construction.

Referring to the drawings, A represents a steel beam, shown in this instance as an I-beam embedded in cementitious material B, which is poured into the form provided by the centering or mold boards C. The weak points in the soffit usually occur at E at each side of the lower portion of the beam, but in reinforcing the soffit, the clips should not interfere with the free flow of material between the mold boards and the beam, so that the material may be tamped on all sides and underneath the beam to form a complete monolithic mass.

Figure 2:
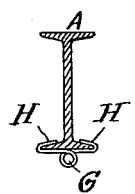
Figure 3:
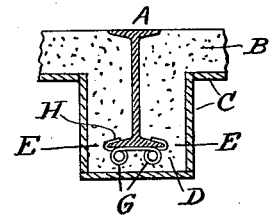
Figure 4:
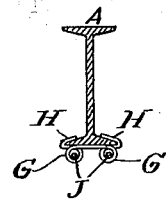

My improved clip comprises in its simplest form a narrow bar or strip of metal F, having one end bent upon itself to form a securing hook H at one side of the main body portion of the clip, said hook being adapted in one form of the invention to be secured over the lower flange of the beam, as shown, for instance, in Fig. 1. The other end of the bar or strip of metal may be bent upon itself in the reverse direction to the securing hook to form at least one closed loop or eye G on the opposite side of the main body portion of the clip, so that said eye G is adapted to lie below the beam. The clips F are spaced transversely along the beam and wholly embedded in the cementitious material. In Fig. 2 the clip is provided with two hooks H, while in Fig. 3 the clip is bent to form a plurality of loops or eyes G at one side of the body portion, and a hook H at each end on the opposite side of the main body portion of the clip. There is nothing to obstruct the flow of material, which readily enters the eye or eyes G underneath the beam and forms a lock, so that the clips hold the material up against the beam. The clips are of such construction that they may be placed in position after the wood centering C is in place as well as before, by simply reaching into the wooden form and bending the hooks H over the flange of the beam. Usually one hook H will be formed in a clip, leaving one free end to be bent over the beam. If desired, the clips may be utilized to hold longitudinal rods J as shown in Fig. 4, which expedient need only be used in those cases made necessary by constructional work, and the rods J have the disadvantage of impeding the flow of material.

Figure 5:
Figure 6:
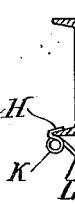
Figure 7:
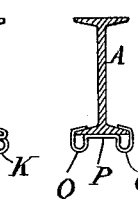
Figure 8:
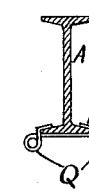
Figure 9:
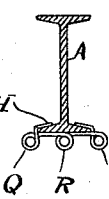

In Fig. 5, but one loop G' is shown, preferably elongated to oval form, and in Fig. 6 the loops K are connected by an angular connector or body portion L. In Fig. 7 the loops O are open instead of closed and connected by a straight body portion P, and in Fig. 8 the loops Q lie at the edges of the lower flange of the beam. In Fig. 9 an intermediate loop R is shown between the loops Q.

Figure 10:
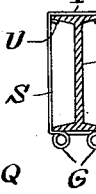
Figure 11:
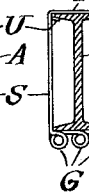
Figure 12:
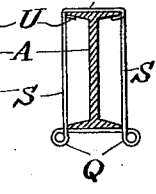

If desired or required in the building specification, the soffit clips may take the form shown in Figs. 10, 11 and 12, in which the ends of the clips are extended upwardly at S and bent at right angles at T over the top of the beam and then hooked at U under the upper flange. The clips so constructed may be provided with the forms of loops shown in the other figures and there may be as many loops G or Q as desired. The clips shown in Figs. 10, 11 and 12 reinforce the concrete throughout the height of the beam, but this is generally considered to be unnecessary in the construction shown.

The clips may be formed of round material as shown in Fig. 15, flat material as shown in Fig. 16, square material as shown in Fig. 17, square twisted material as shown in Fig. 18, or any other suitable form of material which may be found applicable.

Figure 13:
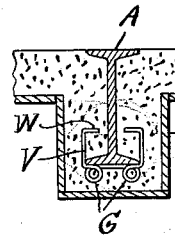

Instead of attaching the clips to the lower flange of the beam, the clips may be constructed as in Fig. 13, for instance, in which the clip is provided with the legs V and angular or bent portions W adapted to be embedded in the concrete so that the clip is supported by the concrete rather than by the beam. The points of support in the concrete lie along the height of the beam and by this means the soffit is reinforced. If desired, the clip may be partially supported by the beam and partially supported by being embedded in the concrete as shown in Fig. 14, in which the clip is provided with the inturned portions adapted to be attached to the beam while the upright portions Y are provided with the angular ends Z embedded in the concrete.

In all the constructions shown in the drawings, it will be seen that the loops or eyes of the clips are adapted to lie close against the under portion of the beam, and do not extend down into the corners of the form provided by the mold boards C, so that ample space is left between the clips and the mold boards to permit tamping. The material not only enters the eyes, but fills the space or spaces between the eyes and completely embeds the clip in the material.

I am aware that reinforcing clips have heretofore been devised, as for instance, as shown in the patent to Himmelwright, No. 786,289, in which the clips are constructed out of metal plates slit at their opposite ends so as to provide arms extending down into the corners of the form, but I do not claim this construction, as my improvement is primarily designed to do away with this costly and unmechanical construction, which makes the successful building of the complete beam without voids almost impossible.

I claim and desire to obtain by Letters Patent the following:

1. As a new article of manufacture, a soffit clip comprising a narrow bar or strip of metal, having one end bent upon itself to form a securing hook at one side of the main body portion of the clip, the other end being bent upon itself reversely to the securing hook to form a closed loop or eye at the opposite side of the main body portion, said clip being adapted to lie transversely to the beam and wholly embedded in the cementitious material surrounding the beam, with the loop or eye lying below the beam.

2. As a new article of manufacture, a soffit clip comprising a narrow bar or strip of metal looped upon itself to form a plurality of closed loops or eyes at one side of the main body portion of the clip, the ends being bent to form securing hooks at the opposite ends of the main body portion, said clip being adapted to lie transversely of the beam and wholly embedded in the cementitious material surrounding the beam, with the loops or eyes lying below the beam.

3. As a new article of manufacture, a soffit clip comprising a narrow bar or strip of metal looped upon itself to form a closed loop or eye at one side of the main body portion of the clip, the ends being bent to form securing hooks at the opposite ends of the main body portion, said clip being adapted to lie transversely of the beam and wholly embedded in the cementitious material surrounding the beam, with the loop or eye lying below the beam.

In testimony whereof I have signed this specification in the presence of two subscribing witnesses.

GUSTAV EDWARD ESCHER.

Witnesses:
K. G. LE ARD,
A. C. PARHAM.

Copies of this patent may be obtained for five cents each, by addressing the "Commissioner of Patents, Washington, D. C."